United States Patent [19]

Paek

[11] Patent Number: 5,138,489
[45] Date of Patent: Aug. 11, 1992

[54] SPATIALLY INCOHERENT HOLOGRAPHIC CORRELATOR

[75] Inventor: Eung-Gi Paek, Freehold, N.J.

[73] Assignee: Bell Communiations Research, Inc., Livingston, N.J.

[21] Appl. No.: 713,421

[22] Filed: Jun. 10, 1991

[51] Int. Cl.$^5$ .............................. G02B 27/46
[52] U.S. Cl. .................... 359/561; 359/29; 364/822; 382/31; 382/42
[58] Field of Search ................ 359/561, 29; 364/822; 382/31, 42

[56] References Cited

U.S. PATENT DOCUMENTS

| | | | |
|---|---|---|---|
| 4,903,314 | 2/1990 | Fine | 382/31 |
| 4,955,691 | 9/1990 | Mifune et al. | 359/29 |
| 4,988,153 | 1/1991 | Paek | 350/3.8 |
| 5,028,102 | 7/1991 | Ogura et al. | 382/31 |

OTHER PUBLICATIONS

E. G. Paek et al, "Holographic On-Line Learning Machine for Multicategory Classification," *Japanese Journal of Applied Physics*, 1990, vol. 29, pp. L1332-L1334.
H. J. Yoo et al, "Fabrication of a two-dimensional phased array of vertical-cavity surface-emitting lasers," Applied Physics letters, 1990, vol. 56, pp. 1198-1200.
A. Von Lehmen et al, "Independently addressable InGaAs/GaAs vertical-cavity surface-emitting laser arrays," *Electronics Letters*, 1991, vol. 27, pp. 583-585.
D. Psaltis et al, "Optical image correlation with a binary spatial light modulator," *Optical Engineering*, 1984, vol. 23, pp. 698-704.
W. K. Chan et al, "Optically Controlled Surface Emitting Lasers," *Technical Digest, International Electron Devices Meeting Proceedings*, 1990, pp. 6.9.1-6.9.3.

*Primary Examiner*—Jack I. Berman
*Attorney, Agent, or Firm*—Leonard Charles Suchyta; Charles S. Guenzer

[57] ABSTRACT

An incoherent holographic correlator comprising a two-dimensional array of surface-emitting lasers which are selectable in an arbitrary pattern so as to emit a beam containing the pattern. The pattern is spatially incoherent because the lasers are not phase-locked but it is temporally coherent. The beams are collimated onto a recorded hologram, and each of the beams produces a diffracted beam from the recording. All the diffracted beams are focused onto an imaging plane. A high-intensity spot represents a strong correlation between the selected pattern on the laser array and the image previously recorded in the hologram.

14 Claims, 3 Drawing Sheets

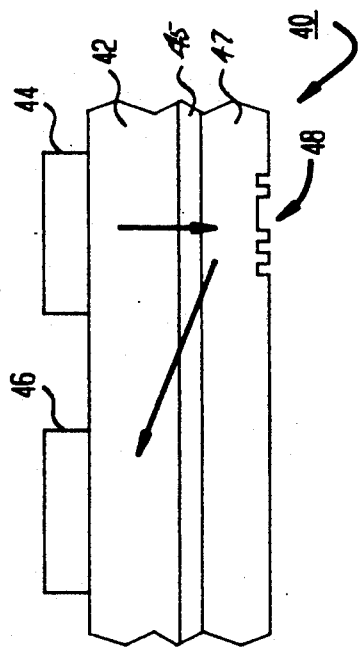
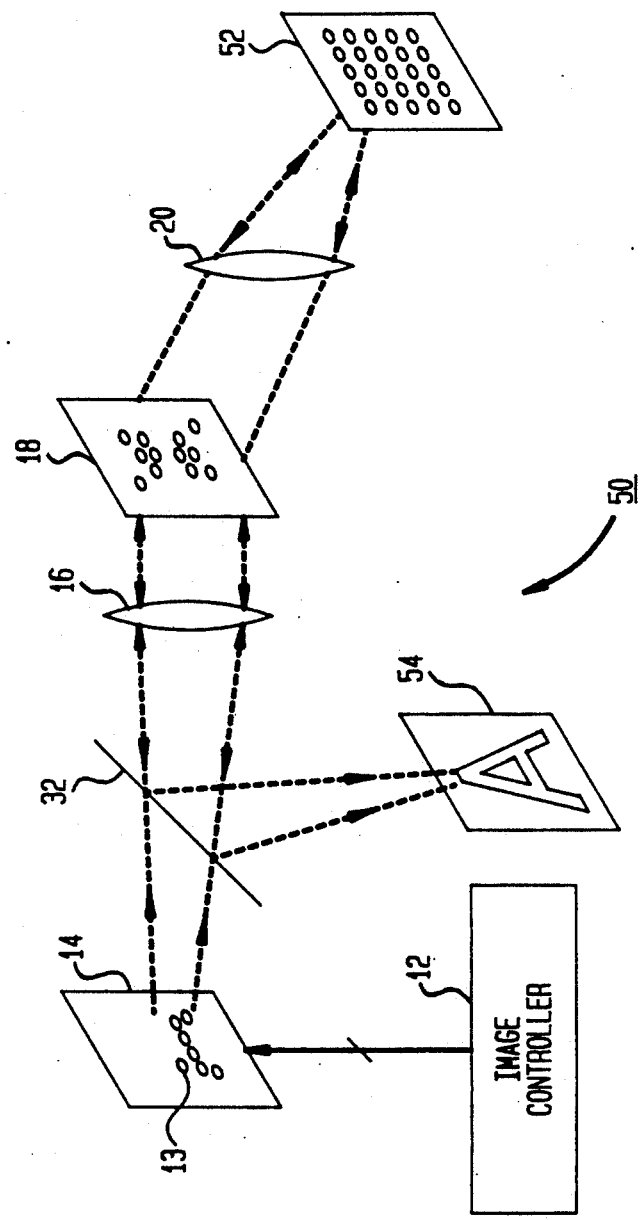

SPATIALLY INCOHERENT HOLOGRAPHIC CORRELATOR

FIELD OF THE INVENTION

The invention relates generally to holography; in particular, to holographic correlators.

BACKGROUND ART

Holographic correlators offer the possibility of correlating two-dimensional images or data against multiple reference images in a very short time. The reference images are recorded in a holographic recording medium, each image having a respective recording angle and hence a respective diffraction angle when the recorded medium is used as a filter. Then, an unknown image is impressed in a collimated beam incident upon the filter. The intensity of the light diffracted by the filter at a respective diffraction angle represents the correlation between the unknown image and the reference image associated with that diffraction angle. If the unknown image corresponds exactly to one of the reference images, a single optical beam is produced. If the unknown image is "close" to one of the reference images but significant differences exist, the diffraction angle corresponding to the "close" reference image will have a high intensity, but the remaining diffraction angles will likely have finite but smaller intensities. Thus, the reference image that produces the highest intensity output for an unknown image represents the best choice for that unknown image. Such a correlator has obvious application for pattern recognition, image processing, and neural networks.

The VanderLugt correlator has been widely used for a holographic correlator. However, the systems reported to date have been bulky and extremely sensitive to the positioning of the filter.

An incoherent holographic correlator overcomes some of these problems. It requires a wide light beam that is temporally coherent and spatially incoherent. Temporal coherency is required to faithfully reconstruct without dispersion the image stored in the holographic filter. Spatial incoherence is required to average out the interference terms which are sensitive to the phase difference between different parts of the unknown image. One light source used in prior-art incoherent correlators has been a widely collimated standard laser beam passing through a rotating diffuser. Another light source has been a cathode ray tube whose screen is covered with a spectral filter having a narrow linewidth. Neither solution has been fully satisfactory. The diffuser or narrow bandwidth filter reduces the light intensity. The physical rotation of the diffuser presents mechanical problems. The CRT is bulky.

The present inventor has disclosed a holographic memory in U.S. Pat. No. 4,988,153. This memory holographically records images in a medium and selects an image by activating one of many lasers integrated in a two-dimensional array. He has also disclosed a holographic learning machine in U.S. patent application Ser. No. 07/588,710, filed Sep. 27, 1990 and together with others in "Holographic On-Line Learning machine for Multicategory Classification," *Japanese Journal of Applied Physics*, volume 19, 1990, pp. L1332–L1334. In the learning machine, a linear array of mutually coherent intensity-modulated laser beams provide reference beams simultaneously irradiating a recording medium in order to correct the diffraction patterns produced by a spatially coherent teaching image simultaneously irradiating the medium.

SUMMARY OF THE INVENTION

Accordingly, it is an object of the invention to provide a rugged, incoherent holographic correlator.

The invention can be summarized as an incoherent correlator in which an image to be correlated is spatially impressed upon an array of surface-emitting lasers. Their respective outputs are focused upon a hologram containing one or more holographic recordings of known images. The optical output of the hologram is focused upon a plane. High-intensity outputs indicate high correlations.

BRIEF DESCRIPTION OF THE DRAWINGS

FIG. 3 is a cross-sectional illustration of an integrated version of the second embodiment of the invention.

FIG. 4 is a pictorial illustration of an associative memory of the invention.

DETAILED DESCRIPTION OF THE PREFERRED EMBODIMENT

Figure 1:
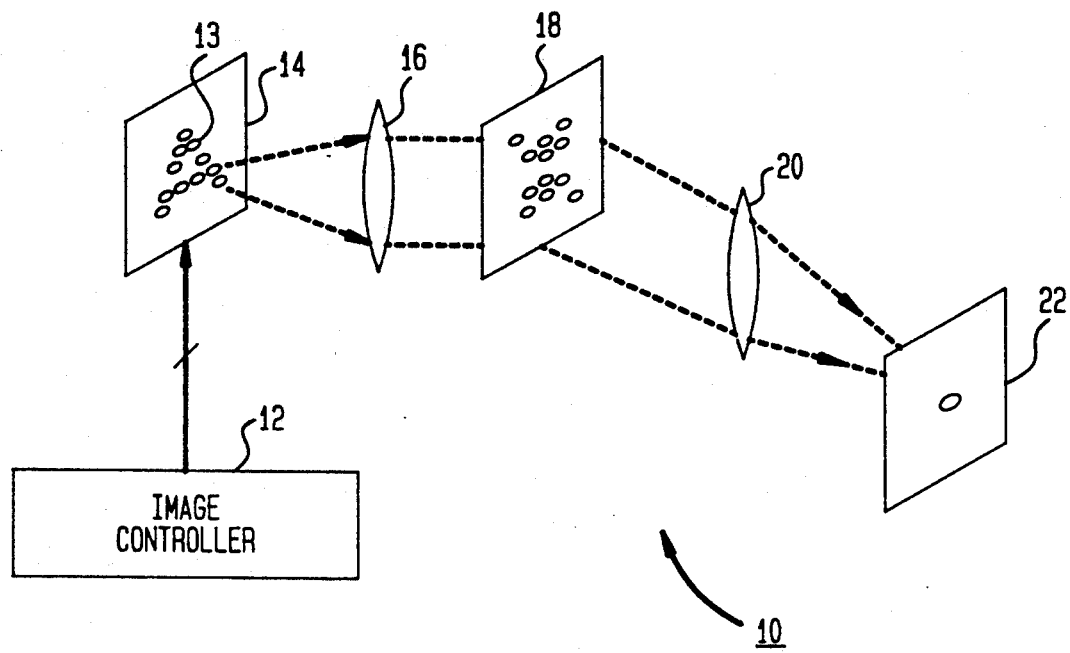
FIG. 1 is a pictorial illustration of a first embodiment of the incoherent correlator of the invention.

A rugged incoherent correlator 10 of the invention is illustrated pictorially in FIG. 1. An image controller 12 simultaneously activates many of the individual lasers 13 in an array 14 of surface-emitting, vertical-cavity laser diodes 13, so as to cause the lasers to be illuminated in the pattern of an image. The figure illustrates the array 14 radiating the letter A with 11 different 13 the lasers 13. The lasers 13 are formed in a rectangular array as an optical integrated circuit on a single semiconductor chip, as was first practically disclosed by Jewell et al. in U.S. Pat. No. 4,949,350. Each laser 13 emits at nominally the same wavelength. However, the outputs of the lasers 13 are not coherently coupled. The frequency bandwidth of the surface-emitting lasers 13 is several gigahertz in pulsed operation, corresponding to coherence times of less than 1 ns. Therefore, interference fringes formed by light from two different lasers 13 will disappear if the detection time is approximately 1 ns or more. If desired, lasers in such an array may be optically coupled so as to be phase locked, as has been disclosed by Kapon et al. in U.S. Pat. No. 5,086,430 and by Yoo et al. in "Fabrication of two-dimensional phased array of vertical-cavity surface-emitting lasers," *Applied Physics Letters*, volume 56, 1990, pp. 1198–1200. However, such a significant degree of optical coupling is difficult to achieve in most configurations. Because of the lack of coherency between the lasers 13, the image, in this case, the letter A, is temporally coherent but spatially incoherent.

A lens 16 of focal length $f_1$ is positioned a distance $f_1$ from the laser array 14 and collimates the image onto a recorded transmissive hologram 18. The hologram 18 has been recorded previously with one or more reference images to be recognized. Each of the activated laser elements causes all recorded images to diffract (reconstruct) a holographic image. The image generated by each laser is shifted by an amount corresponding to the position of that laser.

A second lens 20 of focal length $f_1$ is positioned along the diffraction direction and at a distance $f_1$ from a focal plane 22. The reconstructed images generated by the light from the different lasers add incoherently on the focal plane 22 because each laser 13 operates independently, thereby averaging out the phase-sensitive interference terms. The summation of all the reconstructed images generated by all the activated lasers 13 yields the correlation between the input image and the reference image.

In such an incoherent correlator 10, the hologram 18 need not be separated from the lenses 16 and 20 by their focal lengths $f_1$ and may even be in contact, thereby reducing the physical length of the system.

EXAMPLE

An incoherent correlator 10 was fabricated and tested. The laser array was fabricated according to the procedure described by Von Lehmen et al. in "Independently addressable InGaAs/GaAs vertical-cavity surface-emitting laser arrays," *Electronics Letters*, volume 27, 1991, pp. 583–585. It consisted of an 8×8 array of lasers 13, each independently addressable through 64 wire pads. Each laser had a diameter of 20 μm, and they were set on 254 μm spacings. The lasers 13 emitted at a nominal wavelength of 980 nm. The image on the laser array 14 was controlled by a computer interfaced with separate electronic drivers circuits connected to each of the 64 wire pads.

The hologram 18 was a plane hologram recorded on a thermoplastic plate, available from Newport Corporation as Model HC-301, so as to achieve shift invariant recognition. The hologram 18 was recorded according to standard techniques but with an argon laser having a wavelength of 514.5 nm because most holographic recording materials are insensitive at the wavelength (~1 μm) of the laser array 14. A HeNe laser could have been used. The laser beam was expanded and cleaned by a pin-hole spatial filter and a beam expander, and it was then split into two beams. One of the split beams illuminated an input transparency positioned at the location of the laser array 14 in FIG. 1, and the other served as the reference beam also illuminating the hologram 18 to be recorded. The first lens 16 Fourier transformed the input image at the position of the hologram 18, and the Fourier transformed image interfered with the reference beam. The photosensitive hologram 18 was thus recorded with the resultant interference fringes. The conventional Fourier holographic recording configuration provides the least aberrational effects when the recording wavelength differs from the reconstructing wavelengths. Furthermore, to reduce the distortion introduced by the changed wavelengths, the angle between the reference and object beams was reduced to 6° to preserve the paraxial condition. This angle was far less than the optimally sensitive 24° of the thermoplastic plate. Photographic film could avoid this problem. To increase the diffraction efficiency and to reconstruct images of high fidelity, a diffuser was placed in front of the input transparency presenting the image for holographic recording. For reconstruction, a two-dimensional detector array, similar to a TV imager array, was placed in the imaging plane 22, and the optical intensities were visually monitored. Many details are found in the previously cited Paek patent.

For the test, the hologram 18 was recorded with a single image, the modern Bell logo, a stylized bell. Then, during the test the Bell logo and a Chinese character signifying "light" alternately illuminated from the laser array 14. During illumination of the Bell logo, a single and bright output spot formed on the imaging plane 22, representing the self-correlation of the Bell logo. During illumination of the holographically unrecorded Chinese character, several peaks appeared representing the cross-correlations between the Bell logo and the Chinese character. However, all the cross-correlation peaks were significantly dimmer than the self-correlation peak.

The tolerance of the incoherent correlator to positioning errors was tested by moving the hologram 18. Even after it had been moved 7 mm, the correlation outputs were not noticeably changed.

COMPARATIVE EXAMPLE

A VanderLugt correlator was tested with the same Bell logo. For precise positioning of the hologram, a sharp auto-correlation peak was obtained. However, when the hologram was moved by only 50 μm, the recognition peak completely disappeared. Therefore, unlike the correlator of the invention, the VanderLugt correlator is not robust.

Although this example recorded a single reference image and used a single photodetector, multiple images can be recorded and correlated on multiple photodetectors following the procedure described by Paek for the learning machine.

Figure 2:
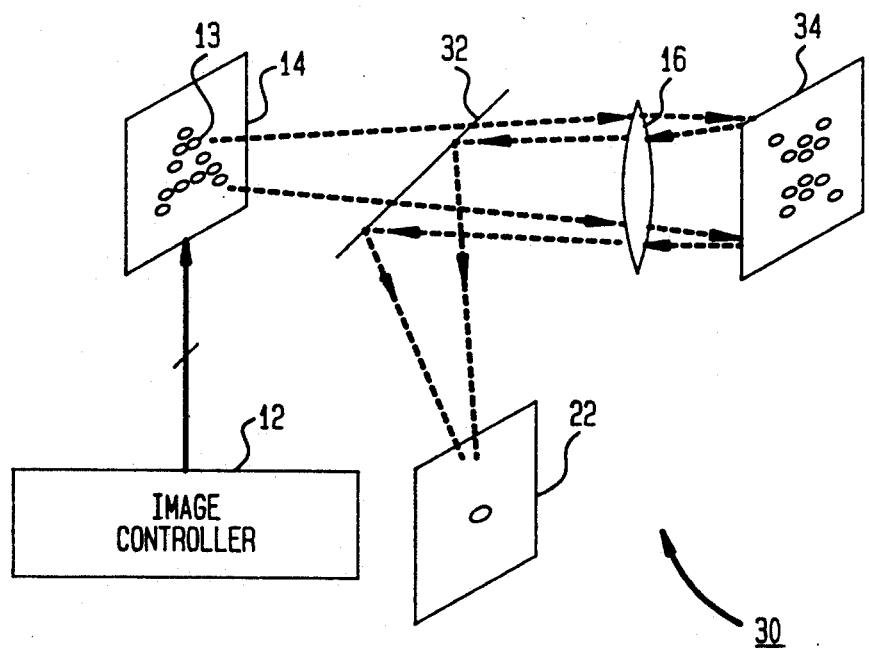
FIG. 2 is a pictorial illustration of a second embodiment of the incoherent correlator of the invention.

The beam paths in the correlator 10 of FIG. 1 can be folded in a more compact correlator 30 illustrated pictorially in FIG. 2. The image from the laser array 14 passes through a beam splitter 32, such as a half-silvered mirror, before striking a reflecting hologram 34. The correlated image is reflectively diffracted from the hologram 34 along a direction slightly different than the input beam direction, is split to the image plane 22 by the splitter 32, and is focused on the image plane 22 by the lens 16. In this configuration, the image plane 22 is positioned below the beam splitter 32. The reflecting hologram 34 is freely accessible from its back side so as to allow its recording by independent means. For example, it is well known that the holographic filter function (the interference fringes) can be calculated on a computer for an arbitrary image. The filter function can then be loaded onto an electronically addressable spatial light modulator, such as a magneto-optic device or a liquid-crystal display. An example of the magneto-optic device is disclosed by Psaltis et al. in "Optical image correlation with a binary spatial light modulator," *Optical Engineering*, volume 23, 1984, pp. 698–704. Either of these devices would be placed at the position of the hologram 34 and would electrically control the amplitude of light reflected from their surfaces. Alternatively, a GaAs substrate can be used as the reflective hologram 34 and be recorded in a lithographic process by a rastered electron beam according to the computer-generated filter function to generate a phase hologram.

A reflective hologram allows for an integrated incoherent correlator 40 illustrated in cross section in FIG. 3. A GaAs substrate 42 has formed therein a vertical-cavity laser array 44 and a photodetector 46. The GaAs substrate 42 is transparent to the light emitted by the laser array 44. In most vertical-cavity laser arrays fabricated to date, the lasers emit through the substrate. A zone plate 45 is formed at the back of the substrate 42 so as to form a focusing lens having a focal length equal to the optical thickness (adjusted for the refractive index) of the substrate 42 intervening between it and the lasers in the array 44. Alternatively, the zone plate 45 may be replaced by a holographically recorded pattern or by a microlenslet array. Attached to the back of the zone plate 45 is a recording medium 47 having formed in its back side a holographic filter pattern 48. The pattern 48 may be formed by electron beam irradiation after assembly of the correlator 40. Light diffracted from the pattern 48 is detected by the photodetector 46. Similarly to the other correlators, an image is electrically impressed on the laser array 44 and the correlation is detected by the photodetector 46. Depending on whether the image needs to be shift invariant and whether multiple reference images are recorded in the filter pattern 48, the photodetector 46 may be one detector or an array of detectors.

The correlator 10 of FIG. 1 can be combined with the holographic memory of the previously cited Paek patent on holographic memories to form an optical associative memory 50 as illustrated pictorially in FIG. 4. The image is similarly illuminated on the laser array 14, but it is anticipated that only a partial image is produced. That image is transmitted through the beam splitter 32 to the first lens 16 and the recorded transmissive hologram 18. The images reconstructed from the hologram 18 are focused by the second lens 18 onto an optical neuron array 52. An optical neuron array 52 is an array of surface-emitting lasers, each of which is optically controlled. Such an array 52 has been disclosed by Chan et al. in U.S. patent application, Ser. No. 07/697,805, filed May 9, 1991 and in "Optically controlled surface emitting lasers," *Technical Digest, International Electron Devices Meeting Proceedings*, 1990, pp. 6.9.1–6.9.3. All the lasers in the neuron array 52 have a threshold for activation, thereby satisfying the requirement that there be a non-linear element at the neuron. Therefore, if there is strong correlation peak, the laser at that location emits a coherent beam. The beam propagates back through the recorded hologram 18, and the correlated image is reconstructed in the reverse passage through the hologram 18. This image is then reflected by the beam splitter 32 onto another focal plane 54. Importantly, the correlated image reconstructed on the focal plane 54 may have portions which were missing from the original partial image on the imaging laser array 14.

The two-stage image corrector 50 of FIG. 4 demonstrates how even more complicated multi-layer networks can be implemented with semiconductor technology, following the conceptual approach disclosed by Rumelhart et al. in the text *Parallel Distributed Processing* (MIT Press, 1986) and illustrated in the embodiment of FIG. 3.

Figure 5:
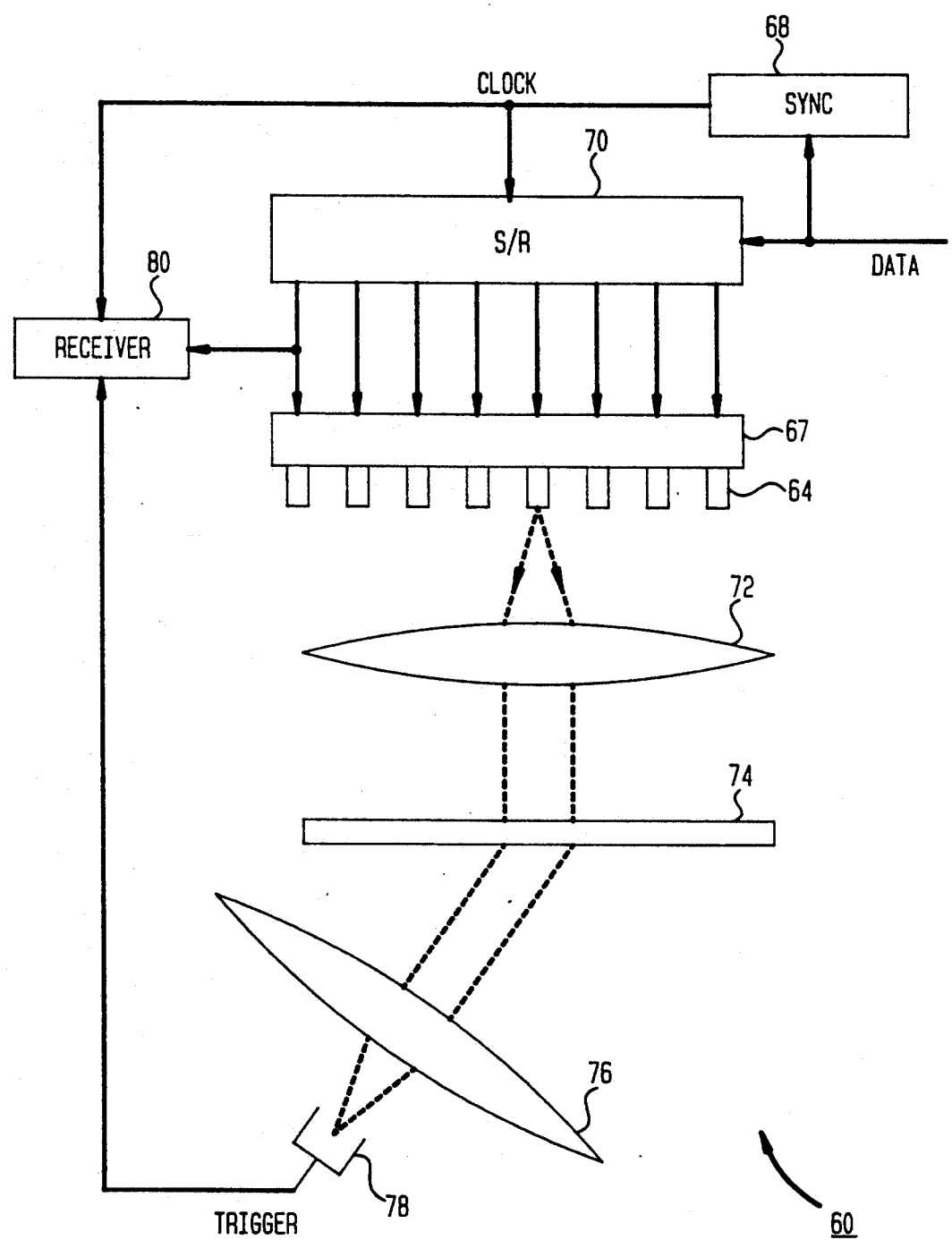
FIG. 5 is a pictorial illustration of an embodiment of a packet-header recognizer of the invention.

The invention is not limited to two-dimensional images. A header recognizer 60 as illustrated in the schematic of FIG. 5 uses a one-dimensional array 67 of N mutually incoherent lasers 64 integrated on a single opto-electronic chip. The purpose of the header recognizer 60 is to detect a predetermined sequence of N bits at the head of a data packet received on a digital data line. The data stream is received both by a synchronizing circuit 68 and a shift register 70. The synchronizing circuit establishes the phase and frequency of the data stream and clocks the shift register 70 so that it outputs in parallel the most recent N bits of the data stream. These N bits, through appropriate driver circuitry, control the N lasers 64. A cylindrical lens 72 collimates the laser outputs onto a hologram 74 prerecorded with the header pattern. The beams diffracted by the hologram 74 are focused by a second cylindrical lens 76 onto a photodetector 78, the output of which is a trigger signal. When the N bits of the data stream stored in the shift-register 70 correspond to the header recorded in the hologram 74, there is a strong auto-correlation output. Thus, the trigger signal indicates to a data receiver 80 that the data portion of the packet following the packet header is about to commence.

Although the example of the invention used an array of lasers emitting in the infra-red, it is preferable to use lasers emitting in the visible spectrum where current holographic recording media are sensitive.

Thus, the incoherent holographic correlator of the invention accurately correlates high-resolution images. Because the system does not require any moving parts or bulky optical components, the entire system can be integrated using rapidly developing semiconductor fabrication techniques. The associative memory of the invention is compact, rugged, and very fast.

What is claimed is:

1. An incoherent holographic correlator, comprising:
   an array of individually activatable surface-emitting diode lasers, said diode lasers being optically non-coherent among themselves when more than one of said diode lasers are activated;
   means for simultaneously activating a selected plurality of said diode lasers to form an emitting pattern;
   a hologram impressed with at least one reference pattern and irradiated with said emitting pattern; and
   a surface upon which images reconstructed through said hologram by all of said activated diodes lasers are overlapped.

2. An incoherent correlator as recited in claim 1, wherein said array of lasers are integrated in an optical integrated circuit.

3. An incoherent correlator as recited in claim 2, wherein said array of lasers are arranged in a two dimensional array on said optical integrated circuit.

4. An incoherent holographic correlator as recited in claim 2, further comprising a first optical system for collimating beams emanating from said activated diode lasers onto said hologram.

5. An incoherent correlator as recited in claim 4, further comprising a second optical system for focusing a beam diffracted from said hologram onto said surface.

6. An incoherent holographic correlator as recited in claim 4, further comprising at least one photodetector disposed at said surface.

7. An incoherent holographic correlator as recited in claim 6, where said at least one photodetector is an array of photodetectors arranged on said surface.

8. An incoherent holographic correlator as recited in claim 7, further comprising threshold circuits associated with each of said photodetectors.

9. An incoherent holographic correlator as recited in claim 7, further comprising an array of second surface-emitting diode lasers separately activatable in response to an output of a respective one of said photodetectors exceeding a predetermined threshold.

10. An incoherent correlator as recited in claim 9, wherein output beams of said second lasers irradiate said hologram.

11. An incoherent correlator as recited in claim 4, wherein said hologram is a reflective hologram and further comprising:
   a beam splitter interposed between said laser array, said hologram, and said at least one photodetector.

12. An incoherent correlator as recited in claim 4, wherein said array of lasers, said first optical system, and said hologram as integrated into a rigid structure.

13. An integrated incoherent holographic correlator, comprising:
   a spacer substantially transparent at a wavelength;
   an array of surface-emitting lasers emitting at said wavelength and formed on a first side of said spacer;
   at least one photodetector responsive to said wavelength and formed on said first side of said spacer;
   a lens having a focal length, formed on a second side of said spacer and separated from said array of surface-emitting lasers by an optical distance equal to said focal length; and
   a hologram integratedly attached to a side of said lens opposite from said spacer.

14. An integrated incoherent holographic correlator as recited in claim 13, further comprising a body in which a diffraction pattern of said hologram is impressed on a side of said body opposite from said lens.

* * * * *